United States Patent [19]
Nickell et al.

[11] Patent Number: 5,113,356
[45] Date of Patent: May 12, 1992

[54] COLORIZING BLACK AND WHITE DOCUMENTS

[75] Inventors: Eric S. Nickell, Batangas, Philippines; Robert R. Buckley; David E. Rumph; Robert M. Coleman, all of Pasadena, Calif.

[73] Assignee: Xerox Corporation, Stamford, Conn.

[21] Appl. No.: 632,818

[22] Filed: Dec. 24, 1990

[51] Int. Cl.$^5$ .............................................. G06K 15/00
[52] U.S. Cl. ..................................... 395/108; 395/131
[58] Field of Search ................................ 364/519–520, 364/930 MS, 235 MS; 346/157, 154; 358/296, 298, 75, 80

[56] References Cited

U.S. PATENT DOCUMENTS

| | | | |
|---|---|---|---|
| 4,516,139 | 5/1985 | Takiguchi | 346/75 |
| 4,857,955 | 8/1989 | Crandall | 355/328 |

Primary Examiner—Arthur G. Evans
Attorney, Agent, or Firm—Robert E. Cunha

[57] ABSTRACT

A software package is described which resides in a color printing system and which automatically intercepts and colorizes black and white documents (or recolors color documents, if desired) that are sent to the color printer. The description includes pictorial flow charts and segments of code from an existing implementation in a Pascal-like language, implemented for documents expressed in a high-level page description language (PDL). The functionality of each major process in the software is explained in detail, including as examples the process of capturing and parsing user-specified modifications to the automatic coloring instructions, the process of coloring graphical objects according to their existing fill patterns, the process of coloring text and adding textual features such as dropshadows, and the process of coloring bitmaps.

8 Claims, 6 Drawing Sheets

COLORIZING BLACK AND WHITE DOCUMENTS

BACKGROUND OF THE INVENTION

This invention is a method of producing a colored print from an electronic version of a black and white or color original. More specifically, it is a software package installed in a color printer that will accept a black and white or color original described in a page description language and, automatically or under user control, output a print, parts of which may be printed in various colors.

A multitude of page description languages (PDLs), including Postscript Interpress, are available as interfaces between computers and printers; some have been widely standardized. Most PDLs can specify black and white area patterns, bitmaps, lines, and text characteristics like fonts, sizes, and other attributes (e.g., underline). Some are beginning to specify colors in a variety of ways.

In the past, most drawing, painting, publishing, and graphics software packages produced documents in black and white, and color printers were rare. Thus, many documents currently exist which are completely black and white. These black and white pages, of course, print in black and white even when sent to a color printer.

However, as color printers become more prevalent, there is a desire to use existing black and white software to produce pages which can print in color. There is also a desire to add functionality to rudimentary color software which does not allow may coloring features. Finally, there is also an increasing desire in the industry to re-edit formerly black and white pages to include some color. At least one presentation graphics package expedites this last desire by allowing users to turn all objects with a particular black and white pattern into a color from among a limited list of colors. Similarly, text, bitmaps and lines can be edited to create a color document from a former black and white document.

Such a system is described on page 137 of the Cricket Presents User's Guide. This is a graphics presentation software package which imports black and white files, and allows users to more easily edit them into files with colored text, lines, bitmaps or patterns. In essence, Cricket Presents gives users some shortcuts for editing black and white documents to include color.

One adverse characteristic of this system is that colors on the display often look very different when printed by a color printer, yet the user has no control in Cricket presents over the color definitions at the printer. If the color is not satisfactory, the document must be re-edited or redesigned. A second problem is that the original black and white document is lost in the process of color editing, and so must be stored separately for printing on a black and white printer. The user then has two documents to manage, and any changes to the text of one, for example, must be made to the other as well. A third disadvantage is that if the user has a large number of black and white documents, each one must be individually edited for color, a cumbersome task. Fourth, the user has a very limited selection of colors. Fifth, because color printers are expensive, there is often only one color printer to serve many users in a group. However, even if there is only one printer, there must be a copy of the Cricket Presents software running on the computer of each person who wants to use its color editing capabilities.

Another system to partially color black and white text documents is described in U.S. Pat. No. 4,857,955. A two-color printer is used. One color, usually black, is used for the basic text, and the second color is used as a highlight color. The printer is programmed to identify one feature of the incoming data, such as italics, bold characters, parentheses, etc, and print that identified text in the highlight color. This avoids some of the problems of Cricket Presents. First, the software is in the printer, so each computer which wants to use the color printer does not need a separate copy of the software. Also, the black and white document does not have to be edited by hand by the user; the printer automatically does the coloring. However, this system is limited to one color not under the control of the user, is extremely limited in the features it can color, can color only one type of feature per document, works only on text, and cannot operate on the standard page description languages in use today.

A more adaptable and flexible system for coloring black and white documents is needed, one which would allow users control over changing the printer's colors, would allow documents to be automatically colored if desired without extensive editing by the user, would color a large variety of features, would give users manual control to change the automatic coloring defaults on a page-by-page basis, would reside in the color printer so that multiple copies of the software are not needed, and would be able to work with the standard page description languages.

SUMMARY OF THE INVENTION

In this invention, a software package is installed in the front end of a color printer, for intercepting the page description language and modifying it according to the operator's requirements. Whatever characteristics the original had may now be converted to color. For example, underlined text in the original can be printed as plain colored text instead, or the underline can be printed in one color and the text in another, or other shapes such as colored dropshadows and/or highlights can be added or modified. Halftoned material, italics, bold letters, particular fonts, lines, patterns and may other features of a black and white original could be recognized and printed in user-specific or automatically-specified colors. A color document can even be sent to the printer, with the software set to recognize and change the colors in the document. The black and white (or color) original which was sent to the printer remains unchanged (it is changed only in the printer environment), and many aspects of the color printing process are brought under the control of the user.

BRIEF DESCRIPTION OF THE FIGURES AND TABLES

The Figures included show pictorially the overall structure of the processes being described, including the data involved (represented by boxes or plain text), the flow of data (arrows) and each sub-process involved (circles). The Tables associated with each Figure show segments of source code representing one implementation of the invention for a particular high-level PDL (Interpress) and particular graphics and presentation software (the Xerox ViewPoint suite of software). The programming language used is Cedar, a strongly-typed language similar to the more common language Pascal.

FIG. 1/Table 1 show an overview of the entire process. Each of the specific sub-processes in FIG. 1 (circles 1.1-1.5) is detailed later in succeeding figures and tables, as follows:

FIG. 2a/Table 2a give details for extracting document-embedded commands used in the production of the Transforms database (shown in box 1.2 in overview FIG. 1).

FIG. 2b/Table 2b give details for the production of the Mappings database (also shown in box 1.2 in overview FIG. 1).

FIG. 3 shows details for the colorizing of filling graphical objects (circle 1.3 in overview FIG. 1). Table 3a contains the main colorizing code implementing FIG. 3; Table 3b contains sample software/data for one particular graphics package and PDL.

FIG. 4/Table 4 give details for the colorizing of text (circle 1.4 in overview FIG. 1).

FIG. 5/Table 5 give details for the colorizing of bitmaps (circle 1.5 in overview FIG. 1).

DETAILED DESCRIPTION OF THE INVENTION

Figure 1:
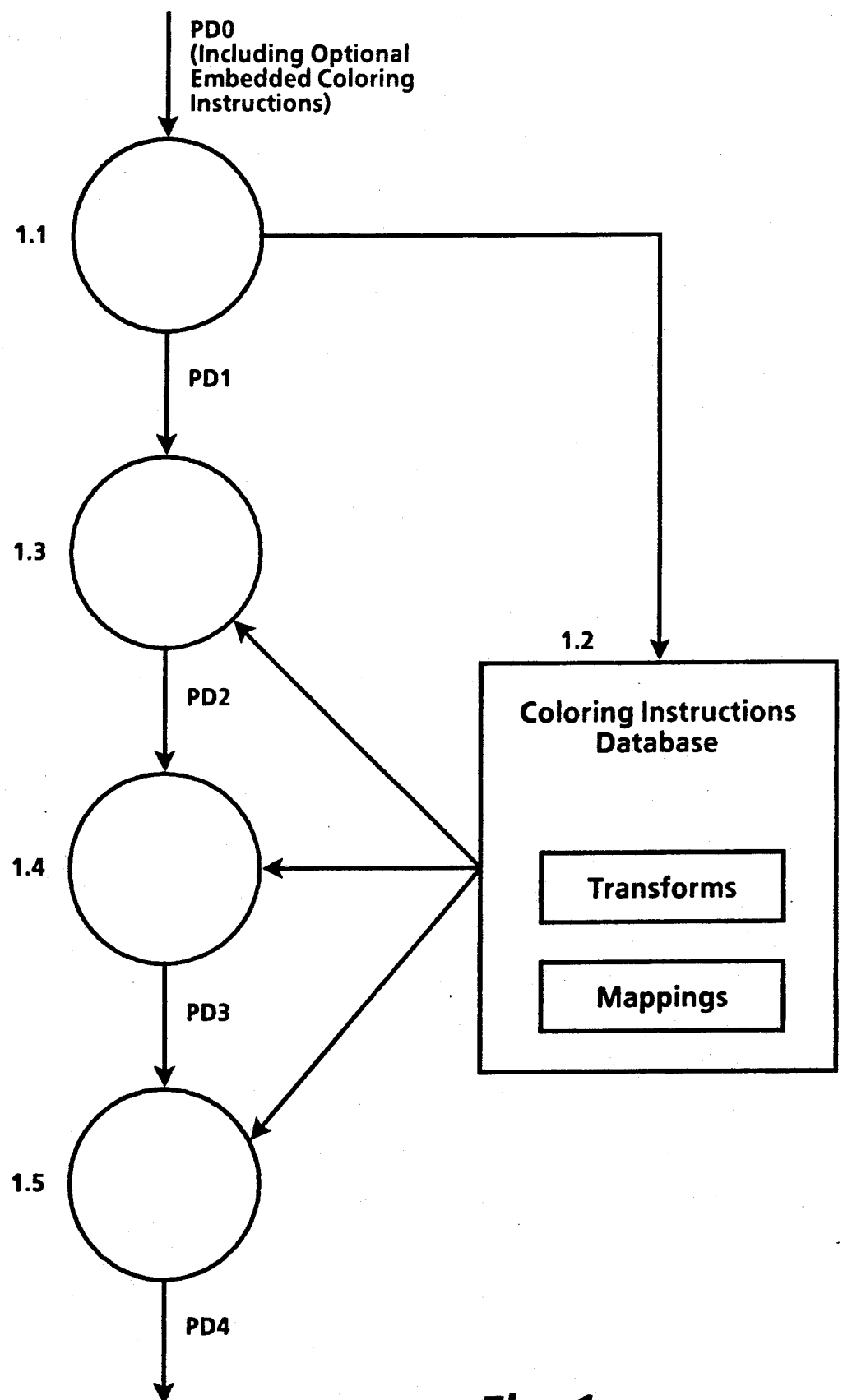

Overview Details see FIG. 1 and Table 1

TABLE 1: Overview

DoRope: PUBLIC PROC [fromIP: ROPE, palette: Profiles.Profile, checkSystemSetting:
   CheckSystemSettingProc] RETURNS [toIP: ROPE] ~ {
   paletteSlices: LIST OF Profiles.Slice _ palette.GetProfileSlices; – – *a profile is defined
      with "file slices" and "rope slices"*

1. Get the default coloring commands
clientFileSlices: LIST OF Profiles.Slice ~ GetProfileFileSlices[paletteSlices]; – – *default
   profile from client*

2. Get and clean up the custom coloring commands coming through client
clientRopeSlice: ROPE ~
      CleanupUserCommands[RopeFromProfileRopeSlices[paletteSlices], palette];
   – – *custom commands from the client (eg, printer messages from user)*

DO
   customColorsFound: BOOL _ FALSE;
   documentRopeSlice: ROPE _ NIL; – – *custom cmds from document's current
      CustomColorsPage*
   curPalette: Profiles.Profile _ palette; – – *stores the current palette for each doc
      section*

3. Get & clean the custom coloring commands in the document, if any
[documentRopeSlice: documentRopeSlice, stillToColorize: stillToColorize] _
      ObtainEmbeddedProfile[stillToColorize];
documentRopeSlice _ CleanupUserCommands[documentRopeSlice, palette];

curPalette _ Profiles.CreateFromSlices[slices: JoinLists[clientFileSlices,
      LIST[[rope[documentRopeSlice.Concat[clientRopeSlice]]]]], keepFresh:
      FALSE];

4. Get the color mappings requested, if any
mapData: MapData ~ GetMappings[curPalette];

5. Using the new palette, perform all requested colorizations
FOR each: LIST OF SettingData _ settings, each.rest UNTIL each = NIL DO
   IF each.first.colorization#NIL THEN {
      IF If[each.first.setting.key] THEN ipToColorize _ each.first.colorization[ip:
         ipToColorize, palette: curPalette, checkSystemSetting:
         checkSystemSetting, mapData: mapData];
      EXITS AbandonColorization = > NULL;
   };
ENDLOOP;

finalIP _ finalIP.Concat[ipToColorize];
IF stillToColorize = NIL THEN EXIT;
ENDLOOP;
RETURN [Rope.Concat[header, finalIP]]; – – *the colorized ip*
};

A black and white document PD0 (Page Description 0) is introduced at the top left of FIG. 1 and is changed successively in the printer environment by each process 1.1-1.5 to emerge for printing as PD4, which is a colorized page description of PD0.

In process 1.1, Construct Database of Coloring Instructions, two databases are produced—the Transforms database and the Mappings database. Together these constitute the Coloring Instructions for document PD0.

The Transforms database contains instructions on how to transform the various black and white patterns, text markings, colors, or other black and white features to specified colors. The Mappings database specifies requested mappings of these colors to new colors. While the Transforms database enables the conversion of individual features to specified colors, the Mappings database often is applied globally or sub-globally (as in "all text") to achieve large-scale color mappings. For example, the mapping data might contain a formula which would darken all colors in the image by 30%. Or, mappings may be used to achieve special effects, such as mapping colors on the page to "Spring-like" colors or other specialized palettes. It is even possible to use the Mappings database to "reverse-colorize" a document, producing a black and white or gray-value print of a color document (to use, e.g., as an easy-to-copy handout in a presentation).

After the Transforms and Mappings databases are constructed, the document is modified by three successive processes. Process 1.3 identifies graphical objects like circles, rectangles, elipses, etc. and colors or re-colors them according to their black and white pattern or their former color. Process 1.4 looks for test that is marked in specified ways and colors it according to the instructions, and can add new shapes or text features.

Process 1.5 looks for bitmaps or scanned images and colors them.

Table 1 contains the top-level code which implements FIG. 1.

The first three steps of the code in Table 1 correspond to FIG. 1.1, the building of the Transforms database, which provides the first part of the document's Coloring Instructions. These three steps reflect the fact that there are three sources of coloring instructions for each document. First, there is a set of default options that is built into the printer. (Called "clientFileSlices" in the code). Second, for printers which accept messages, the operator can modify the default coloring by sending messages directly to the printer along with the document ("clientRopeSlice"). Third, coloring instructions may be included in the document itself, thus permanently modifying the default options for a particular document. This "documentRopeSlice" is obtained by calling "ObtainEmbeddedProfile" (detailed later). In this last case, coloring instructions in the document are entered into the database, and then stripped from the document so as not to be printed. In fact, PD1 in FIG. 1 consists of PD0 without the document-embedded coloring instructions.

The fourth step in the code in Table 1 finishes implementing FIG. 1.1 by building the Mappings database ("mapData"). It does so by calling "GetMappings" (detailed later).

The fifth step executes a loop which successively implements FIG. 1.3 through 1.5, The loop runs through each of the system "settings", which includes each of the colorizations to be done by a particular printer. Each of the colorization 1.3 to 1.5 is detailed later.

Figure 2A:
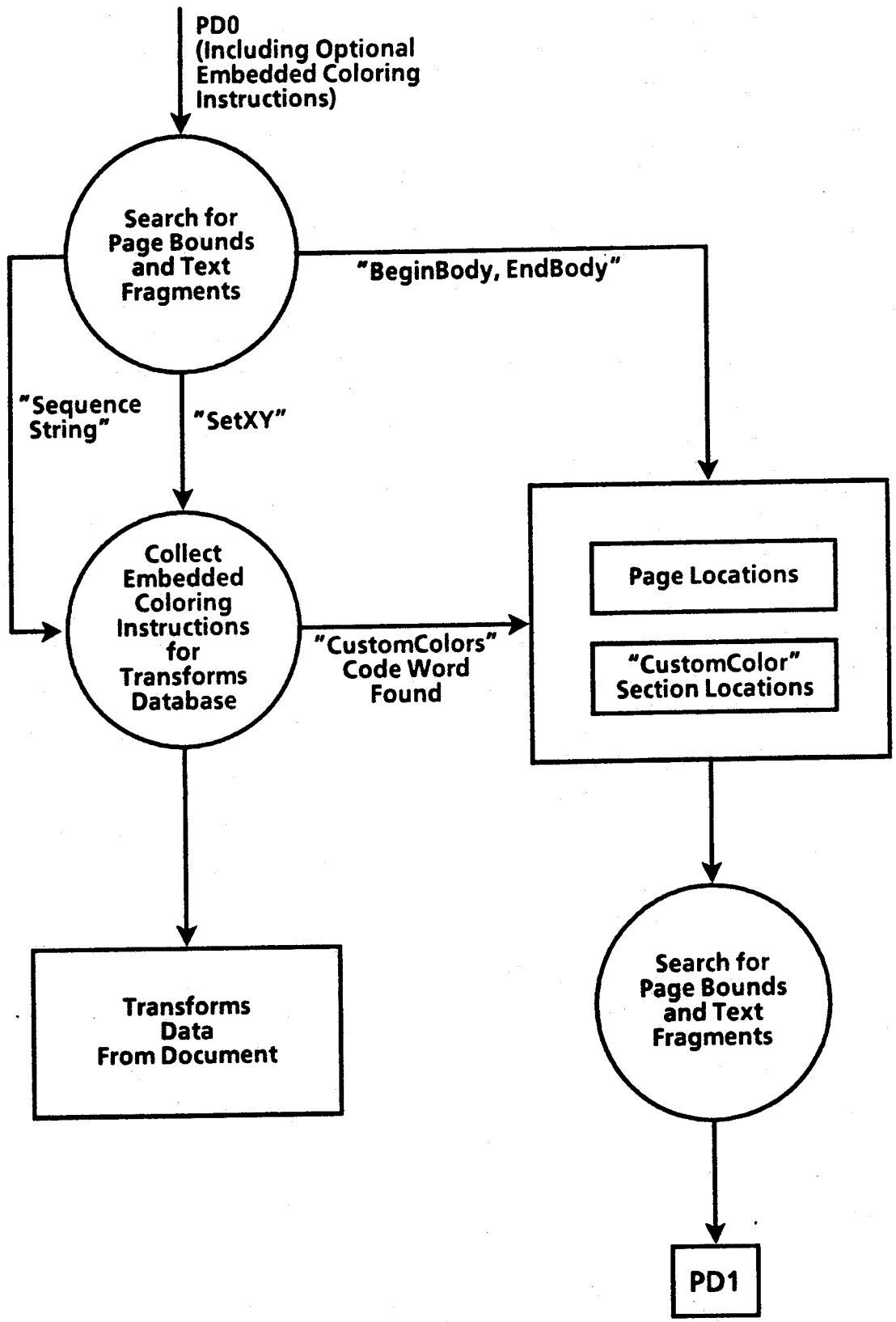

Details on Building the Transforms Database
see FIG. 2a and Table 2a

TABLE 2a: Collect Transforms Data from Document

```
embeddedProfilePassword: ROPE ~ "CustomColor";
endPassword: ROPE ~ "EndCustom";   - -use to end CustomColor commands
ObtainEmbeddedProfile: PROC [oldIp: ROPE] RETURNS [ipToColorize,
      documentRopeSlice, stillToColorize: ROPE __ NIL] ~ {
   IPScan.ScanRope[ip: oldIp, ops: LIST[beginBody, endBody, setxy, setxyrel, setyrel],
         seqs: LIST[sequenceString], action: PerOp];  - -scan for certain PDL
      operators PerOp: IPScan.ScanProc = {
   SELECT op FROM
      beginBody = > {
         IF bodyNest = 0 THEN { bodyStart __ min; enabled __ enabledKeep __ FALSE };
         bodyNest __ bodyNest + 1};
      endBody = > {
         IF (bodyNest __ bodyNest - 1) = 0 THEN SELECT TRUE FROM
            enabled, enabledKeep, everEnabled = > { - -CustomColors found
               ipToColorize __ ipToColorize.Concat[oldIp.Substr[start: flushFrom,
                  len: IF enabled THEN bodyStart - flushFrom ELSE
                     - -include CCPage - - max - flushFrom]];
            profileAddition.PutChar['\n]};
         ENDCASE = > NULL;   - -- CustomColors code word not yet found - -};
      nil = > { - -short sequenceString, ie Text; actual sequence starts at min + 2
         SELECT TRUE FROM
            enabled OR enabledKeep = > { - -we are in a CustomColors section
```

```
            SELECT TRUE FROM
                endPassword.Run[s2: oldIp, pos2: min+2, case:
                        FALSE] = endPasswordLength = >
                        { - - "EndCustomColor" codeword found
                    ipToColorize _ ipToColorize.Concat[oldIp.Substr[start:
                            flushFrom, len: max+1-flushFrom]];  - -store the
                            document minus commands
                    enabled _ enabledKeep _ FALSE;  - -collect no more CC
                        cmds - -};
                ENDCASE = > { - -add line to custom color command database
                    profileAddition.PutRope[oldIp.Substr[start: min+2, len:
                        max-min-2]]};
            embeddedProfilePassword.Run[s2: oldIp, pos2: min+2, case:
                    FALSE] = embeddedProfilePasswordLength = > { - -found the
                    code word. All following text is custom coloring instructions
                enabled _ lookForKeep _ ¯(enabledKeep _ FoundKeep[])};
                ENDCASE = > NULL};
        setxy = > IF enabled OR enabledKeep THEN{ - -tab or newLine
            testY: INT _ ExtractY[oldIp.Substr[start: min, len: max-min]];
            IF curY = testY THEN profileAddition.PutRope[" "]  - -it's a tab
            ELSE profileAddition.PutRope["\n"];  - -add line breaks - -};
        ENDCASE = > ERROR;
};
```

,104

Table 1 shows a three step process in building the Transforms database. The third step—obtaining and excising the embedded coloring instructions from the document—is performed by a procedure called "ObtainEmbeddedProfile". That procedure is detailed here.

In brief, the text of the document is scanned for the code word "CustomColor", which, when found indicates to the system that the subsequent text is not meant to be part of the printed document but instructions to the printer. Similarly, when the code word "EndCustom" is found, that processing stops. It is permissable for a multi-page document to have a custom colors section on each page, allowing each page to be colored differently. The program tracks where each page starts and ends in order to search for the CustomColor commands in each page. Once all color commands are captured, they are stripped from the PDL so that only text to be printed remains in PD1.

FIG. 2a details this process. First, PD0 is searched for three different PDL constructs: text ("seq string"), new lines ("setxy"), and page bounds ("beginBody, endBody"). The page bounds information is stored, to be used later in eliminating pages or sections of pages containing coloring instructions not meant to be printed. The text information is analyzed in the process "Collect Embedded Coloring Instructions". Once the code word "CustomColors" is found, its location is stored and all text following is treated as custom coloring commands, until the end of the page or the code word "EndCustomColors" is found. The custom coloring commands are collected as "Transforms Data From Document", and their locations are used to eliminate them from the printed document, producing PD1.

Table 2a shows the code for FIG. 2a.

The procedure ObtainEmbeddedProfile first calls a utility called IPScan.ScanRope to scan the "rope" (like a string in Pascal) which is the document PD0 to be colored. ScanRope searches for PDL operators such as beginBody, setxy, and so on, and passes their positions (min and max) to the procedure "PerOp".

The procedure PerOp is simply a large select statement which operates differently depending on the PDL operator which has been found. For a beginBody (the beginning of the page), it simply stores the location (min). For an endBody, it checks whether custom instructions were found on that page or not, and either adds the page intact to PD1 ("ipToColorize") or strips out the coloring instructions and then adds the remainder of the page to PD1. For a text string, PerOp checks to see if the text is one of the code words it seeks, or, if the code word is already found, adds the text to the Custom Transform Data ("profileAddition"), or otherwise passes the text by. For a setxy, PerOp checks various hints to determine if this is a new line or a tab, and if a new line supply adds a carriage return to the "profileAddition" that is being built.

By the time IPScan.ScanRope has scanned the entire document PD0, PerOp has been able to extract and store each coloring instruction embedded in the document, and has built a new document, PD1, which is the same as PD0 but without the coloring instructions not meant to be printed.

Figure 2B:
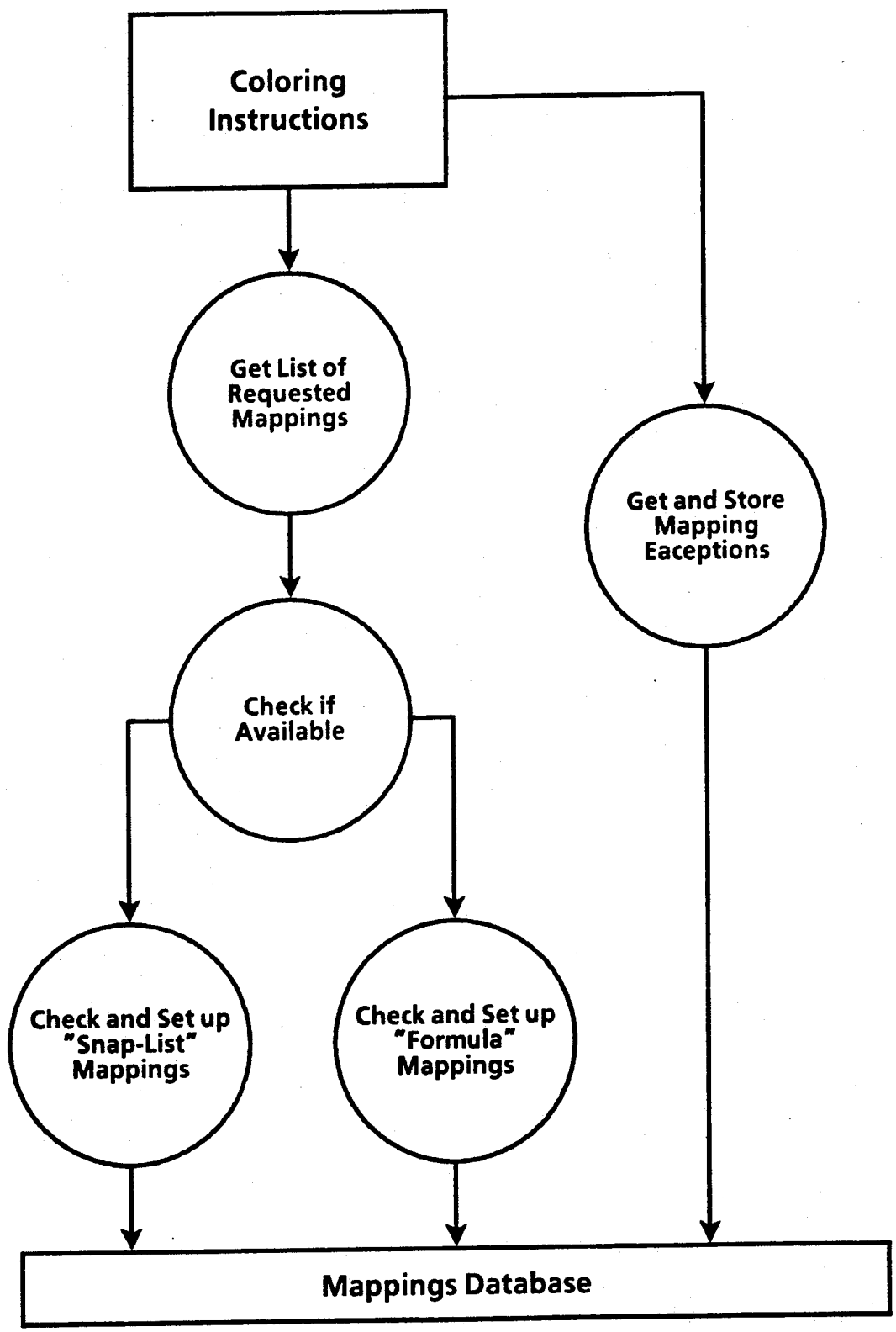

Details on Building the Mappings Database
see FIG. 2b and Table 2b

TABLE 2b: Construct Mappings Database

```
GetMappings: PUBLIC PROC [palette: Profiles.Profile] RETURNS [mapData: MapData] ~ {
    installedMappings, requestedMappings: LIST OF ColorMapping;
    [installedMappings, requestedMappings] _ GetRequested[palette,
            GetStandardMappings[palette]];
    mapData _ NEW[ MapDataRep _ [
        installedMappings: installedMappings,
        requestedMappings: requestedMappings,
        exceptionsPalette: GetExceptionsPalette[palette]]];
};

GetRequested: PROC [palette: Profiles.Profile, installed: LIST OF ColorMapping] RETURNS
            [installedMappings, requestedMappings: LIST OF ColorMapping _ NIL] ~ {
    dummyHead: LIST OF ColorMapping _ LIST[NIL]; -- to add elements to end of a list
    tail: LIST OF ColorMapping _ dummyHead;
    namesRequested: LIST OF ROPE _ Profiles.ListOfTokens[profile: palette, key: "Palette"];
        -- this will include subpalettes and mappings, so sort them out.
    installedMappings _ installed;
    FOR each: LIST OF ROPE _ namesRequested, each.rest UNTIL each = NIL DO
        mapping: ColorMapping;
        [mapping, installedMappings] _ IsAvailable[each.first, installedMappings, palette];
        IF mapping#NIL THEN tail _ (tail.rest _ LIST[mapping]);
    ENDLOOP;
    requestedMappings _ dummyHead.rest;
};

IsAvailable: PROC [name: ROPE, installed: LIST OF ColorMapping, palette: Profiles.Profile]
            RETURNS [mapping: ColorMapping _ NIL, installedMappings: LIST OF
            ColorMapping] ~ {
    DefinedFormulas: Profiles.EnumProc = { -- check defined "Formula" mappings
        [key: ROPE] RETURNS [quit: BOOL _ FALSE]
        prefix: ROPE _ key.Substr[0, key.Find[s2: "Formula", case: FALSE]];
        IF prefix.Equal[s2: name, case: FALSE] THEN {
            mapping _ NEW[ColorMappingRep _ [
                name: prefix,
                mappingProc: FormulaMapper,
                data: Profiles.Line[profile: palette, key: key] ]];
            installedMappings _ CONS[mapping, installedMappings];
            found _ TRUE;
            RETURN [quit: TRUE];
        };
    };
    DefinedSnapMaps: Profiles.EnumProc = { -- check defined "SnapList" mappings
        [key: ROPE] RETURNS [quit: BOOL _ FALSE]
        prefix: ROPE _ key.Substr[0, key.Find[s2: "SnapList", case: FALSE]];
        IF prefix.Equal[s2: name, case: FALSE] THEN {
            mapping _ NEW[ColorMappingRep _ [
                name: prefix,
                mappingProc: SnapMapper,
                data: GetSnapList[key, palette] ]];
            installedMappings _ CONS[mapping, installedMappings];
            found _ TRUE;
            RETURN [quit: TRUE];
```

```
    };
  };
  found: BOOL _ FALSE;
  data: LIST OF ROPE _ NIL;
  FOR each: LIST OF ColorMapping _ installed, each.rest UNTIL each = NIL DO  — —check if
       currently installed
    IF name.Equal[s2: each.first.name, case: FALSE] THEN RETURN [each.first, installed];
    ENDLOOP;
  installedMappings _ installed;
  Profiles.EnumerateKeys[profile: palette, pattern: "*Formula", proc: DefinedFormulas];
       — —check the defined "Formula" mappings, like "GreyFormula"
  IF ¬found THEN Profiles.EnumerateKeys[profile: palette, pattern: "*SnapList", proc:
       DefinedSnapMaps];  — —check the defined "SnapList" mappings, like
       "SpringSnapList"
  };

GetExceptionsPalette: PROC [palette: Profiles.Profile] RETURNS [exceptionsPalette:
     Profiles.Profile _ NIL]¯ {  — —finds all the exceptions to the mappings specified by
     the user, such as "ForceToBlack: c1, c2", which says map c1 & c2 to black no matter
     what the normal mapping would be.
  exceptionList: LIST OF ROPE _ ExpandExceptionCommands[palette];
  IF exceptionList#NIL THEN exceptionsPalette _ Profiles.CreateFromRope[slices:
       exceptionList];
  };
```

The Coloring Instructions Database built in Table 1 and FIG. 1.1 includes not only the Transforms database but also a Mappings database. This is built in Table 1 by calling the procedure GetMappings. This procedure is detailed here.

As shown in FIG. 2b, the first step in building the Mappings database is to retrieve the user's mapping requests from the existing Coloring Instructions. These mapping requests are then checked for availability; color mappings which are requested but not defined either by the user or the system are ignored. (The definitions for user-defined mappings are entered as part of the coloring instructions; this database is searched if the mapping is not found pre-defined in the system.) As part of the check for availability, a mapping is checked to see if it is a "Snap-List" mapping or a "Formula" mapping.

A Snap-List mapping consists of specifying a list of allowable colors. That is, the user may specify that only particular colors can exist on the current page; each color delivered by the Transforms database is compared against the snap list, and the "nearest" available color in the list is chosen. (The definition of the concept of "nearness" is under user control.) For example, by using a snap list of colors that project well on overhead transparencies, a user can ensure good projectability for his document when he decides to print it as a transparency. A Formula mapping, as its name implies, allows the user a wide range of mathematical operators with which to specify operations on the colors delivered by the Transforms database.

If the mapping definition is found under either category, it is stored with its associated data in the Mappings database for later use.

In parallel with the above process in FIG. 2b, colors which are specified by the user to be exceptions to the global mapping processes being requested are also extracted from the Coloring Instructions and added as an exceptions palette to the Mappings Database.

Table 2b contains the associated code for FIG. 2b.

GetMappings is the high-level procedure which calls three others: GetStandardMappings (not shown: simply returns a list of the mappings built-in to the system), GetRequested, and GetExceptionsPalette.

GetRequested is a procedure which maintains a list of mappings already installed, and stores into the Mappings database any of those mappings which have been requested by the user for this particular document and print run. In addition to the built-in mappings, GetRequested calls the procedure IsAvailable to determine whether any mapping not recognized as a built-in mapping has been validly defined by the user as a new mapping.

IsAvailable checks user-defined mappings for validity as Formula or Snap mappings, and if valid adds them to the Mappings database.

In parallel, the procedure GetExceptionsPalette checks for any user-requested exceptions to the general mapping requests and builds a palette of such colors to store in the Mappings database.

Figure 3:
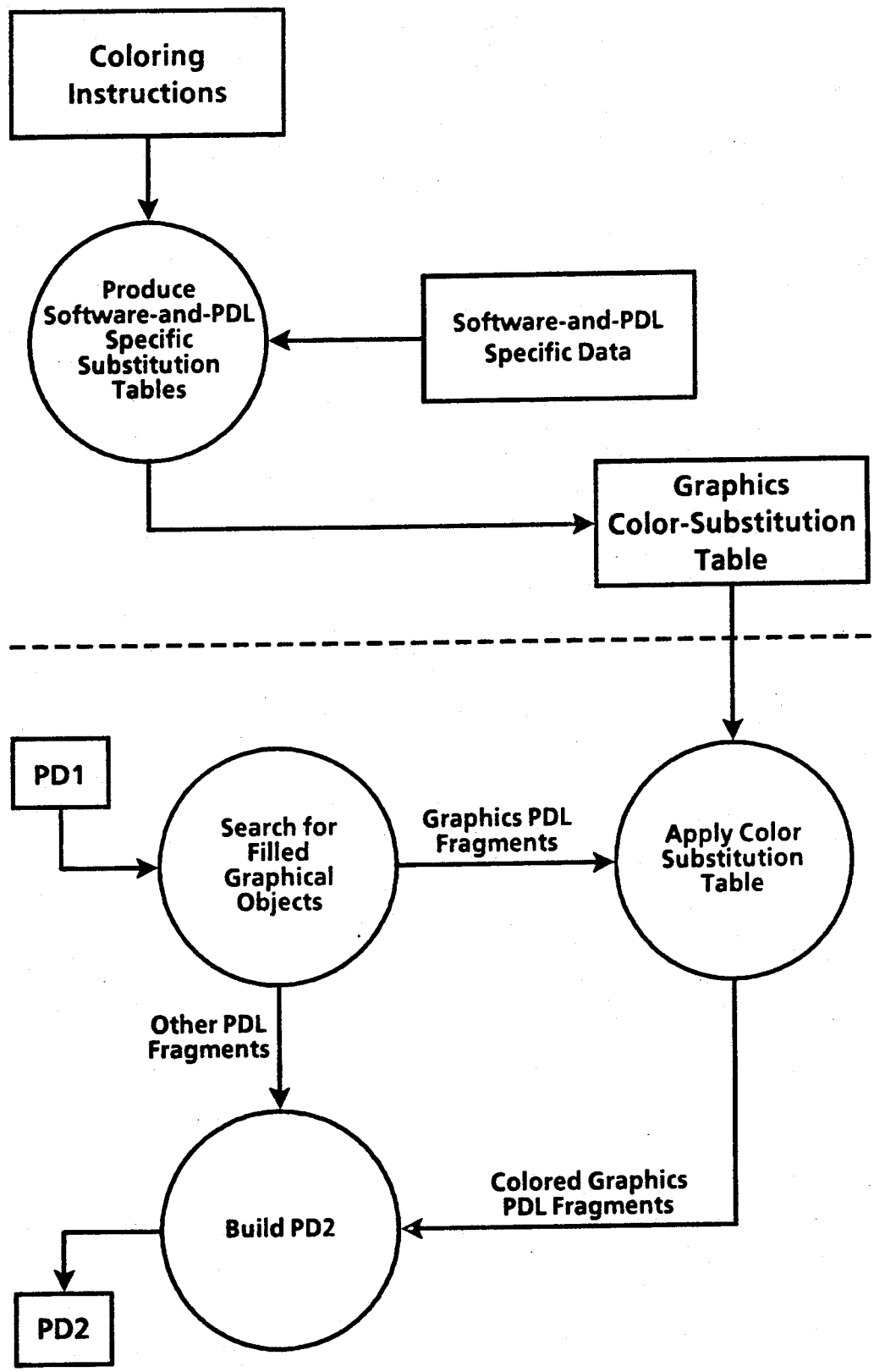

Details on Colorizing Black and White
Graphics/Recolorizing Color Graphics see FIG. 3 and Tables 3a and 3b

TABLE 3a: Colorize Filled Graphical Objects

ColorizeGraphics: PUBLIC PROC [ip: ROPE, subs: SubsInfo, opList: LIST OF Op, getColor:
  GetColorProc, seqList: LIST OF Seq _ NIL, customOnly: BOOL _ FALSE] RETURNS
  [colorizedIP: ROPE _ NIL] ~ {

IPScan.ScanRope[ip: ip, ops: opList, seqs: seqList, action: PerColorSpecified];

PerColorSpecified: IPScan.ScanProc = {
  [min: INT, max: INT, op: IPMaster.Op _ nil, seq: IPScan.Seq _ nil, num: INTEGER _
  0, punt: BOOL _ FALSE]
  [newMin: min, newMax: max, color: color, addendum: addendum] _ getColor[ip, min,
    max]; — —*client defines the piece of the ip to be replaced and what addendum
    to add after the replacement* replacementColor _ GetReplacementColor[color: color, subs: subs, customOnly:
    customOnly];

WITH replacementColor SELECT FROM
    replacementColor: ROPE => { — —*Constant color*
      colorizedIP _ colorizedIP.Cat[ip.Substr[start: flushFrom, len: min—
        flushFrom], replacementColor, addendum]; — —*replace
        MakeSampledBlack section w/ replacementColor*
      flushFrom _ max; — —*reset marker to after original color & ISET section*
    };
    replacementColor: REF SampledColorIPFragments => { — —*Sampled color (eg,
      sweep)*
      vectorSet: vs _ BuildVectorSet[ip: ip, pos: max, sweepAngleMod360:
        replacementColor.sweepAngleMod360, removeDefiningObject:
        replacementColor.removeDefiningObject];
      *build the transform for the pixel array*
      IPMaster.PutReal[stream: out, val: vs.height.x];
      IPMaster.PutReal[stream: out, val: vs.width.x];
      IPMaster.PutReal[stream: out, val: vs.offset.x];
      IPMaster.PutReal[stream: out, val: vs.height.y];
      IPMaster.PutReal[stream: out, val: vs.width.y];
      IPMaster.PutReal[stream: out, val: vs.offset.y];

replacement _ Rope.Cat[replacementColor.beforeTransform,
        out.RopeFromROS[], replacementColor.afterTransform];

colorizedIP _ colorizedIP.Cat[ip.Substr[start: flushFrom, len: min—
        flushFrom], replacement, addendum]; — —*replace original color*
    };
    ENDCASE => ERROR; — —*no other kinds of colors*
};

TABLE 3b: Sample Code/Data to Make Color Substitution Table

ProPaletteFromProfile: PROC [profile: Profiles.Profile, mapData: MapData] RETURNS
  [proColorSubstitution: SubsInfo] ~ {
    ProTextureProc: GfxTextureProc ~ {RETURN [proTexture[texture]]};
    ProGrayProc: GfxGrayProc ~ {
      brickIndex: ProGray _ Real.Round[gray * ProGray.LAST];
      RETURN [proGray[brickIndex]]
    };

```
ProSeqAction: SeqAction ¯ {
    InstallMapping: PROC [from: ROPE, to: Color] ¯ {
        IF ¯SymTab.Insert[x: proSubs, key: from, val: to] THEN {
            already: ROPE __ NARROW[proSubs.Fetch[from].val, Color].value;  - -Fetch
                what's already there.
            SIGNAL ColorizeViewPoint.Warning[□MalformedPaletteEntry,
                IO.PutFR[format: "Pro sampledBlack from \"%g\" collides with that
                    from \"%g\"", v1: [rope[key]], v2: [rope[already]]]]};
        };
        IF textured THEN { - -construct PDL for textured fill patterns
            to: Color ¯ NEW [ColorRep __ [value: key, type: IF (¯textured AND transparent)
                THEN □TransGray ELSE □ProPattern]];
            InstallMapping[from: makeSampledBlack, to: to]}
        ELSE { - -construct PDL SetGrays for opaque, non -textured grays
            to: Color ¯ NEW [ColorRep __ [value: key, type: □OpaqGray]];
            InstallMapping[from: ProIllustratorSetGrayFromReal[real], to: to];
        ENDLOOP};
    };
    GfxPaletteFromProfile[profile: profile, seqAction: ProSeqAction, gfxTexture:
        ProTextureProc, gfxGray: ProGrayProc];
    proColorSubstitution __ NEW [SubsInfoRep __ [palette: profile, mapData: mapData,
        subpaletteList: prefixes, subs: proSubs]];
};

proTexture: ARRAY ProTexture OF Pattern __ [
    [000170B, 000170B, 000170B, 000170B, 000170B, 000170B, 000170B, 000170B,
        000170B, 000170B, 000170B, 000170B, 000170B, 000170B, 000170B,
        000170B], - - A: lineVert
    [000000B, 000000B, 000000B, 000000B, 000000B, 177777B, 177777B, 177777B,
        177777B, 000000B, 000000B, 000000B, 000000B, 000000B, 000000B,
        000000B], - - B: lineHoriz proGray: ARRAY ProGray OF Pattern __ [
    [0, 0, 0, 0, 0, 0, 0, 0, 0, 0, 0, 0, 0, 0, 0, 0],
    [0, 2020H, 0, 0, 0, 202H, 0, 0, 0, 2020H, 0, 0, 0, 202H, 0, 0],
    [0, 6060H, 0, 0, 0, 606H, 0, 0, 0, 6060H, 0, 0, 0, 606H, 0, 0],
    [0, 6060H, 2020H, 0, 0, 606H, 202H, 0, 0, 6060H, 2020H, 0, 0, 606H, 202H, 0],
```

FIG. 1.3 shows where the process of colorizing black and white graphical objects and (re-)colorizing color graphical objects occurs. Graphical objects include objects like circles, boxes, ellipses, general trajectories, and may include lines and curves depending upon the software used to generate them. Details of this process are shown in FIG. 3, and the code to implement this process is shown in Tables 3a (the main colorizing code) and 3b (example of software/data specific to a given graphics generator and PDL).

FIG. 3 is in two parts. In the upper half, the Coloring Instruction for the document (built by process 1.1) are combined with software-and-PDL-specific data to produce a Graphics Color Substitution Table. This table is different for each software package which produces graphical objects and for each PDL which is being used.

In the lower half of FIG. 3, PD1 is searched for filled graphical objects, filled with either black and white textures, grays, or colors. All other PDL fragments are passed over unscathed, but any PD1 fragments which defines a filled graphical object is passed to a process ("Apply Color Substitution Table") which uses the Graphics Color Substitution Table to identify the new color which that fill should become and to thereby create a new, colored PDL fragment. The colored PDL fragment is then passed on to be incorporated along with the other PDL fragments into PD2.

Table 3a shows the code implementing the lower half of FIG. 3 through a procedure called Colorize Graphics. By the time Colorize Graphics is called, the appropriate Graphics Color Substitution Table has already been built and is handed in a "subs". Also handed in is an oplist and seqlist, which are lists of PDL operators and sequences that define filled graphical objects for this particular software and PDL.

Colorize Graphics first asks the utility IPScan. Scan Rope to search the PDL document ("ip"), looking for the PDL objects defined by oplist and seqlist. Whenever one of those objects is found, the procedure Per Color Specified is called, with the position of the object in the PDL ("min" and "max").

Per Color Specified does the work of replacing the original PDL fragment with a colored fragment. It first asks its client exactly which piece of the PDL is to be replaced, by using the call-back procedure get Color. It then calls the procedure Get Replacement color (not detailed), which simply looks up the color in "subs" to find the expected replacement color, and expresses that color in correct PDL syntax.

The replacement color may be one of two kinds in most PDLs. A select statement chooses between the two colors, which must be handled differently. A "constant color" is straightforward; "replacementColor" is simply concated into "colorizedIP", the colorized version of "ip" which is being built (PD2 in FIG. 3). A "sampled color" needs some additional work. A sampled color is a pixel array; a color which varies spatially, such as a photograph or a computer-generated color sweep. In this case the procedure Build Vector Set is called, which retrieves from the PD1 the spatial dimensions of the color ("vs"—the vector set). This vector set is then used to construct the more complicated PDL replacement, which is then concated into colorizedIP.

Table 3b shows one example of the software-specific code and data need to implement the upper half of FIG. 3. This code used highly specific data, a few lines of which are shown as an example at the bottom of Table 3b, to construct the Graphics Color Substitution Table for the Pro-Illustrator presentation graphics software and interpress PDL. Since this is highly specific, the software in Table 3b will be described very briefly.

Pro-Illustrator produces hundreds of black and white fill patterns by combining a variable gray background with 12 standard textures (e.g., horizontal lines, vertical lines, diagonal lines, wavy lines), labeled A through L. A human-readable description of a black and white pattern might then be, e.g. 17% BH, which means a 17% gray background superimposed on textures B and H. The procedure Pro Palette From Profile takes the human-readable descriptions of black and white fill patterns found in the Coloring Instructions Database (FIG. 1.2) and converts them into the PDL construct which would be built by Pro-Illustrator to express that pattern. It does this, in essence, by Bit-Or-ing the elemental textures found in pro Texture and pro Gray, and then installs the resulting PDL bit patterns using install Mapping. Using these patterns as keys in a symbol table, it then installs the appropriate new color for each bit pattern, as specified again by the Coloring Instructions Database.

Figure 4:
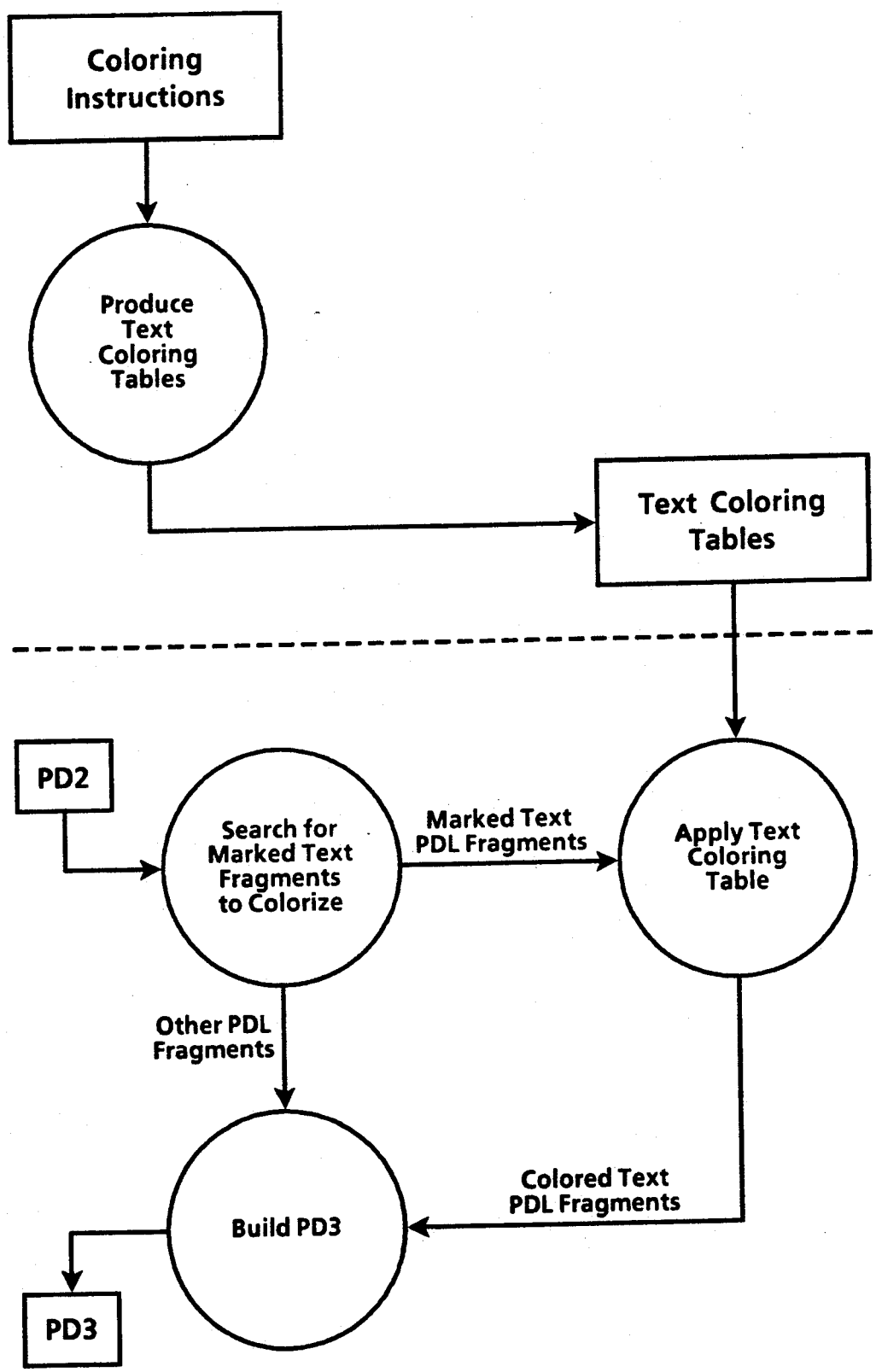

DETAILS ON COLORIZING TEXT see FIG. 4 and Table 4

TABLE 4: Colorize Text

TextPaletteFromProfile: PROC [profile: Profiles.Profile] RETURNS [textPalette: TextPalette] ~ {

*Process the coloring instructions for each of the allowable text markings:*
Process[strike: FALSE, u: underline, key: "Underline"];
Process[strike: FALSE, u: doubleUnderline, key: "DoubleUnderline"];
Process[strike: TRUE, u: none, key: "Strikeout"];
Process[strike: TRUE, u: underline, key: "StrikeoutUnderline"];
Process[strike: TRUE, u: doubleUnderline, key: "StrikeoutDoubleUnderline"];

Process: PROC [strike: BOOL, u: Underline, key: ROPE] ~ {
    toks: LIST OF ROPE _ ColorizeViewPointBackdoor.GetRecursiveValue[key: key,
        palette: profile, subpaletteList: prefixes, levelsAllowed: maxLevels];
        — — *the raw coloring instruction*
    IF Rope.Equal[s1: toks.first, s2: "highlight", case: FALSE] THEN {
        toks _ toks.rest;
        [rest: toks, color: textPalette[u][strike].highlightColor] _
            SubColorFromToks[toks]};
    IF Rope.Equal[s1: toks.first, s2: "dropShadow", case: FALSE] THEN {
        [textPalette[u][strike].offsetIsPercent, textPalette[u][strike].dropShadowOffset]
            _ SetDropShadowParms[key: key, profile: profile, prefixes: prefixes];
        toks _ toks.rest;
        [rest: toks, color: textPalette[u][strike].dropShadowColor] _
            SubColorFromToks[toks]};
    IF Rope.Equal[s1: toks.first, s2: "strike", case: FALSE] THEN {
        toks _ toks.rest;
        textPalette[u][strike].strikeout _ TRUE;
        [rest: toks, color: textPalette[u][strike].strikeoutColor] _
            SubColorFromToks[toks]};
    SELECT TRUE FROM  — —*can't have both*

```
        Rope.Equal[s1: toks.first, s2: "underline", case: FALSE] = > {
            toks __ toks.rest;
            textPalette[u][strike].underline __ underline;
            [rest: toks, color: textPalette[u][strike].underlineColor] __
                    SubColorFromToks[toks]};
        Rope.Equal[s1: toks.first, s2: "doubleunderline", case: FALSE] = > {
            toks __ toks.rest;
            textPalette[u][strike].underline __ doubleUnderline;
            [rest: toks, color: textPalette[u][strike].underlineColor] __
                    SubColorFromToks[toks]};
        ENDCASE = > NULL;
    the remainder of toks will be the requested text color
        textPalette[u][strike].textColor __
                ColorizeViewPointBackdoor.IPFragmentForColorSetting[toks]};
    };
ColorizeText: PUBLIC Colorization ~ {
    Scan the document for startunderline and maskunderline. Call PerOp when found
    IPScan.ScanRope[ip: ip, ops: LIST[startunderline, maskunderline], action: PerOp];
    PerOp: IPScan.ScanProc = {
        [min: INT, max: INT, op: IPMaster.Op __ nil, seq: IPScan.Seq __ nil, num: INTEGER __ 0, punt: BOOL __
            FALSE]
        SELECT op FROM
            startunderline = > { -- Flush everything up to the startunderline
                Flush[min, max];
                type __ waitingMaskU; -- keep looking for MaskUnderline
                };
            maskunderline = > { -- Found some text to be colored
                strikeout, underline: LIST OF MaskUData __ NIL;
                dy, h: INTEGER;
                replace: ROPE;
                index: INT __ min;
                this loop counts the number of strikeouts and underlines
                WHILE index + 6 < = ipSize AND (dy__Num[ip, index])#INTEGER.LAST AND
                        (h__Num[ip, index + 2])#INTEGER.LAST AND ip.Substr[start:
                        index + 4, len: 2].Equal[ "\241\236" -- MASKUNDERLINE -- ] DO
                    IF dy < = 0 THEN underline __ CONS[[dy: dy, h: h], underline]
                    ELSE strikeout __ CONS[[dy: dy, h: h], strikeout];
                    index __ index + 6;
                    ENDLOOP;
                replace __ BuildReplacementForTextStuff[strikeout: strikeout, underline:
                        underline, palette: textPalette, betweenStartUAndMaskU:
                        ip.Substr[start: flushFrom, len: min - flushFrom]];
                Flush[flushTo: 0, skipTo: index, insert: replace];
                };
            ENDCASE;
        };
    Flush: PROC [flushTo: INT, skipTo: INT __ 0, insert: ROPE __ NIL] ~ { -- writes out old
            document to new colored document
        IF insert#NIL THEN newIP __ newIP.Concat[insert];
        IF flushTo > flushFrom THEN newIP __ newIP.Concat[ip.Substr[start: flushFrom, len:
                flushTo - flushFrom]];
        flushFrom __ MAX[flushFrom, flushTo, skipTo];
        type __ waitingStartU;
        };
    };
```

FIG. 1.4 shows where the process of colorizing text occurs. Details of this process are shown in FIG. 4, and the code to implement this process is shown in Table 4.

In colorizing text, many text features such as italics, bold letters, or particular fonts can be selected as triggers for colorization implementation of the invention, the text features which trigger colorization are combinations of strikethrough, underline, and double underline, allowing a total of five different text colorings per page. Text colorization is an example of the colorizer being used to modify shapes. Not only is the text color changed, but the text shape is also modified by adding colored features such as, but not limited to, dropshadows, highlights, underlines, strikeouts, etc. Thus, for example, an underlined sentence might be printed as plain red text, while an underline-strikethrough sentence might become light blue with a green dropshadow.

FIG. 4 shows a process for text colorization parallel to FIG. 3's process for graphics colorization. In the upper half of FIG. 4, the Coloring instructions database is analyzed to produce a machine-readable data structure, a Text Coloring Table, which specifies exactly how each of the five types of marked text (underlined text, double underlined text, etc.) is to be changed (e.g., underlined text becomes red text with yellow highlight, etc.) IN the lower half of FIG. 4, PDL document PD2 is scanned for the start of an underline (in this PDL, strikeouts are expressed as offset underlines). Any part of the document other than marked text is passed through unchanged. Marked text is isolated as a PDL fragment which is to be colored. After counting underlines and strikeouts, the PDL text fragment is passed to a process which uses the Text Coloring Table to produce a new text fragment with all the colors and features requested by the Coloring Instructions. That fragment is then passed back to be integrated into PD3.

Table 4 contains the implementing code for text colorization.

The first procedure, Test Palette From Profile, implements the upper half of FIG. 4. By parsing coloring instructions similar to "Underline test: Highlight [light blue] drop Shadow [green (5%, -5%)] text Color [red]", it produces for each of the five implemented text markings an entry into the Text Coloring Table (called "text Palette"). For each type of marked text, the color and shape of each special feature is recorded: highlight if desired (or NIL if not), dropShadow if desired (the procedure SetDropShadowParms is called to get from the Coloring Instructions the desired shape/offset of the shadow), the color of any desired markings like underlines, and of course the color of the text itself.

The second procedure, ColorizeText, implements the lower half of FIG. 4, As in Table 3, it uses the utility IPScan.Scan Rope to scan PD2, looking for the PD1 operators "startunderline" and "maskunderline". When IPScan finds either of these, it calls the procedure PerOp, passing it the location of the operator. If the operator is a startunderline, PerOp simply wirites out all of PD2 which occurs before the startunderline, since it is unmarked text or unrelated graphics. If the operator is a maskunderline (meaning, underline all text from startunderline to this point), PerOp counts the number of strikeouts and underlines, then uses that information in conjunction with the Text Coloring Table (text Palette) to build a replacement text fragment which is colored as specified. The utility which it calls, BuildReplacementForTextStuff, is a PDL-specific procedure which lays down the necessary PDL fragments for text highlights, dropshadows, etc. in the correct order. Once the new fragment is created, ColorizeText integrates it into PD3, using the small procedure Flush.

By the time all marked text is located and processed, the new document PD3 contains all text colored as instructed, either with the automatic, built-in instructions, or with user instructions overriding the automatic settings.

DETAILS ON COLORIZING BITMAPS

TABLE 5: Colorize Bitmaps

```
ColorizeBitmaps: ColorizeViewPointBackdoor.Colorization ~ {

IPScan.ScanRope[ip: ip, ops: LIST[maskpixel], action: EachBitmap];

EachBitmap: IPScan.ScanProc ~ { - -called for each bitmap found by IPScan
      SELECT op FROM
          maskpixel = > {
             colorFrags: Colors;
             paStats: PixelArrayStats;
             get the user specified colors
             colorFrags _ GetColorIPFrags[palette, mapData, Rope.Concat["Bitmap",
                   Convert.RopeFromInt[(count _ count + 1)]], defaultColors];  - -get
                   the user specified colors
             IF colorFrags.foreground = NIL AND colorFrags.background = NIL THEN  - -no
                   color change for this bitmap - - RETURN;
             get the stats on this pixel array: offset, width, height, scaling, etc
             paStats _ GetPAStats[ip.Substr[min, max - min]];
             newIP _ Rope.Concat[newIP, ip.Substr[flushedTo, min -
                   flushedTo]];  - -flush existing PDL upto the beginning of the bitmap
```

*insert the colors, differently if constant vs sampled colors*
```
        IF colorFrags.background#NIL THEN WITH colorFrags.background SELECT
                 FROM
                    ipFrag: ROPE - -constant color- -  = > newIP __ Rope.Cat[newIP, ipFrag,
                            paStats.rectFrag]; - -insert color, then maskrectangle
                    ipFrag: REF SampledColorIPFragments - -sweep color; must construct
                            sweep- -  = > newIP __ Rope.Cat[newIP,
                            ipFrag.beforeTransform,
                            ColorizeViewPointSweep.ConstructSweepTransform[ts:
                            paStats.ts, sc: ipFrag], ipFrag.afterTransform, paStats.rectFrag];
                            - -insert sweep color, then maskrect
                    ENDCASE = > ERROR; - -system error
        IF colorFrags.foreground#NIL THEN WITH colorFrags.foreground SELECT FROM
                    ipFrag: ROPE - -constant color- -  = > newIP __ Rope.Concat[newIP,
                            ipFrag]; - -insert color so maskpixel uses that as it's color
                    ipFrag: REF SampledColorIPFragments - -sweep color; must construct
                            sweep- -  = > newIP __ Rope.Cat[newIP,
                            ipFrag.beforeTransform,
                            ColorizeViewPointSweep.ConstructSweepTransform[ts:
                            paStats.ts, sc: ipFrag], ipFrag.afterTransform];
                    ENDCASE = > ERROR; - -system error
        flushedTo __ min;  - -flushed up to the p.a., with 2 colors inserted
        };
    ENDCASE = > ERROR; - -system error!
};
newIP __ newIP.Concat[ip.Substr[flushedTo]];
};
```

FIG. 1.5 shows where the process of colorizing bitmaps (single-bit scanned images, logos, etc.) occurs. In this case, the coloring being done is the replacement of black and white pixels in the bitmap with pixels of any two specified colors. Details of this process are shown in FIG. 5, the code to implement this process is shown in Table 5.

Figure 5:
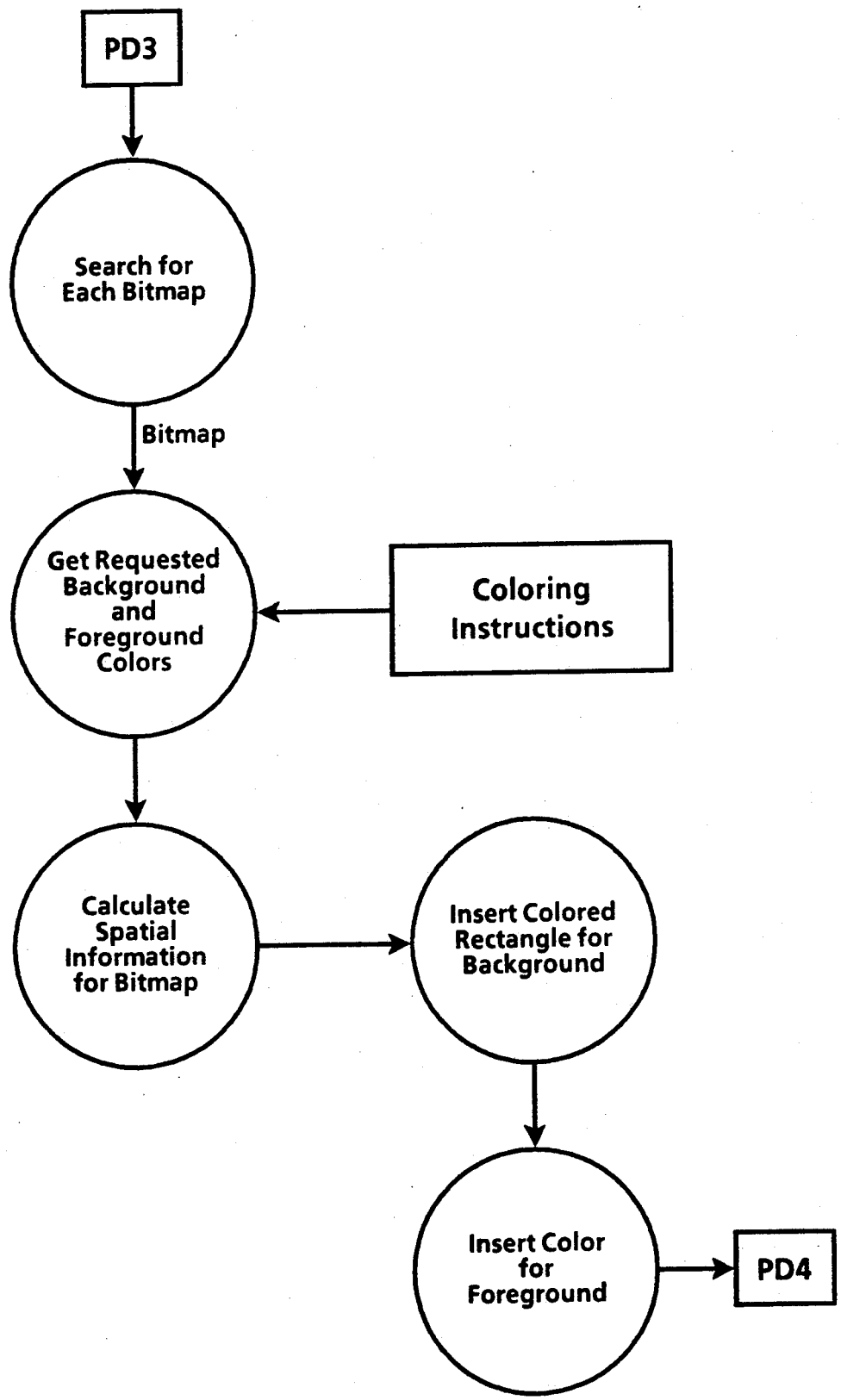

The first step in FIG. 5 is to search PD3 for any bitmaps. When a bitmap is found and identified by position in the page or by an attached label, the second step is to find and parse its coloring instructions in the Coloring Instructions database, so that the new foreground color (replacing black) and background color (replacing white) are each identified for that particular bitmap.

The third step is to examine the bitmap to calculate its spatial information. Embedded in the PDL definition of the bitmap will be its transform information: its width and height in pixels, its offset on the page, its scaling. These numbers are all extracted into a transform set data structure. In the fourth step, the transform set and background color is used to insert a colored rectangle into PD4 which is the exact dimensions of the bitmap, so that it becomes the background color requested for the bitmap. Finally, the foreground color is inserted into PD4 along with the original pixels and a PDL command to image those pixels in the foreground color.

The code shown in Table 5 parallels FIG. 5 closely. The procedure ColorizeBitmaps again uses the IPScan.Scan Rope utility to scan the document ("ip"), looking for the PDL operator "maskpixel", which signals a bitmap. When it find that operator, it calls the procedure Each Bitmap, handing it the min and max positions of the operator and is operands. Each Bitmap uses the utility Get Color IPFrags to look up the requested colors for that bitmap in the Coloring Instructions, express those colors in correct PDL form, and store both foreground and background into color Frags. It then calls Get PAStats to parse the PDL and extract pixel array stats such as pixel width, scaling, etc. into "paStats".

The remaining two pieces of EachBitmap insert the background and the foreground colors into PD4 ("newIP"). As in previous Tables, a distinction is made between constant colors, which are constant spatially and are merely inserted directly, and sampled colors, which vary spatially and so must have that spatial information inserted. In this case, the same spatial information—offset, scaling, width, height—which was extracted from the bitmap may be used for the sampled color which is meant to exactly underlay the bitmap. Thus, for sampled colors, additional work of adding spatial and sampling data is done, in this case by ColorizeViewPointSweep.ConstructSweepTransform, a utility that handles color sweeps construction. By the time the entire document PD3 has been scanned, all bitmaps have been extracted, colored, and reinserted to produce PD4.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. The method of generating a color print comprising the steps of:
   at a user's terminal, generating page description language commands describing a page of patterns, graphics, and text,
   allowing a user to add to said language, instructions which command the colors that certain specified patterns, graphics, and text are to be printed in,
   transmitting said language and instructions to a color printer,
   at the printer, changing said original page description language commands into new page description language commands which describe a page with a different set of patterns, graphics, test, and colors,
   deleting said instructions from the page description language commands, and
   printing the final print by printing each item of patterns, graphics, and text as specified by the new page description language commands.

2. The method of generating a color print comprising the steps of:
   at a user's terminal, generating page description language commands describing a page of patterns, graphics, and text,
   transmitting said language and instructions to a color printer,
   loading the printer with instructions which command the colors that certain specified patterns, graphics, and text are to be printed in,
   changing said original page description language commands into new page description language commands which describe a page with a different set of patterns, graphics, text, and colors,
   deleting said instructions from the page description language commands, and
   printing the final print by printing each item of patterns, graphics, and text as specified by the new page description language commands.

3. The method of generating a color print comprising the steps of:
   loading a printer with first instructions which command the colors that certain specified patterns, graphics, and text are to be printed in,
   at a user's terminal, generating page description language commands describing a page of patterns, graphics, and text,
   allowing a user to add to said language, second instructions which command the colors that certain specified patterns, graphics, and text are to be printed in,
   transmitting said language and instructions to a color printer,
   changing said original page description language commands into new page description language commands which describe a page with a different set of patterns, graphics, text, and colors,
   printing the final print by printing each item of patterns, graphics, and text as specified by the new page description language commands.

4. The method of claim 3 further comprising the step of loading said printer with a set of third instructions from the user's terminal.

5. The method of claim 3 wherein said adding step comprises the adding of a set of second instructions which pertain to all pages which are transmitted to said printer, or a set of second instructions which are specific to each page.

6. The method of claim 3 wherein the user has the option to delete said second instructions from said page description language prior to said printing step.

7. The method of claim 3 wherein said adding and loading steps also comprise adding and loading of commands that vary the colors already commanded.

8. The method of claim 3 wherein said instructions further comprise shaping instructions which command the shapes that certain specified patterns, graphics, and text are to be printed in.

* * * * *